United States Patent [19]

Sakagami

[11] Patent Number: 5,329,525
[45] Date of Patent: Jul. 12, 1994

[54] SYSTEM AND METHOD APPLICABLE TO AUTOMOTIVE VEHICLES UTILIZING TIME DIVISION MULTIPLEX MODE FOR COMMUNICATING DATA BETWEEN MASTER AND SLAVE STATIONS

[75] Inventor: Atsushi Sakagami, Kanagawa, Japan

[73] Assignee: Nissan Motor Company, Limited, Japan

[21] Appl. No.: 601,949

[22] Filed: Oct. 22, 1990

[30] Foreign Application Priority Data

| Oct. 23, 1989 | [JP] | Japan | 1-273830 |
| Oct. 23, 1989 | [JP] | Japan | 1-273831 |
| Oct. 24, 1989 | [JP] | Japan | 1-274800 |

[51] Int. Cl.$^5$ .................................................. H04J 3/02
[52] U.S. Cl. .................................. 370/85.1; 340/825.5
[58] Field of Search ............... 370/58.1, 13, 16, 58.3, 370/25.1, 95.2, 85.7, 85.8, 85.1, 85.15; 340/825.21, 438, 458, 459, 506, 507, 635, 636, 638, 644, 717, 825.06, 825.5, 825.05, 825.51, 825.08, 825.06, 825.54, 825.52; 371/14; 307/440, 442, 445

[56] References Cited

U.S. PATENT DOCUMENTS

| 3,646,274 | 2/1972 | Nadir et al. | 370/85.8 |
| 3,702,008 | 10/1972 | Groth | 370/85.8 |
| 4,227,178 | 10/1980 | Gergaud et al. | 340/825.52 |
| 4,330,857 | 5/1982 | Alvarez, III et al. | 370/95.3 |
| 4,763,323 | 8/1988 | Nelson et al. | 370/85.6 |
| 4,809,266 | 2/1989 | Okada | 370/85.1 |
| 4,821,262 | 4/1989 | Futami | 370/85.1 |
| 4,829,297 | 5/1989 | Ilg et al. | 370/85.8 |
| 4,914,654 | 4/1990 | Matsuda et al. | 370/85.1 |
| 4,926,417 | 5/1990 | Futami et al. | 370/85.1 |
| 4,937,819 | 6/1990 | King | 370/95.1 |
| 4,967,409 | 10/1990 | Narumija et al. | 370/85.6 |
| 4,988,989 | 1/1991 | Goto | 370/85.1 |
| 5,132,680 | 7/1992 | Tezuka et al. | 370/85.8 |
| 5,140,586 | 8/1992 | Kloper et al. | 370/85.15 |

FOREIGN PATENT DOCUMENTS 2406916 5/1979 France .
WO-A-8903145 4/1989 PCT Int'l Appl. .

OTHER PUBLICATIONS

"Multiplexing for the Automotive Industry", W. R. Betts, GEC Review, vol. 2, No. 1, 1986.
"Advanced Automotive Multiplexed Wiring System", D. J. Parish & J. Lucas, IEEE Proceedings, vol. 133, Pt.E. No. 6, Nov. 1986.

*Primary Examiner*—Douglas W. Olms
*Assistant Examiner*—Dang Ton
*Attorney, Agent, or Firm*—Lowe, Price, LeBlanc & Becker

[57] ABSTRACT

A time division multiplex communication system applicable to an automotive vehicle and a method for communicating data between a master station and a plurality of slave stations are disclosed in which a master station is provided for sequentially accessing a plurality of slave stations according to a predetermined calling order within a predetermined period of time and for transmitting a required information to any of the slave stations on the basis of information received from one accessed slave station. A transmission line is connected between the master station and the plurality of the slave stations, and the master station is provided with a logic portion which, responsive to the information from the one accessed slave station, is active for changing the predetermined calling order in a subsequent cycle of the predetermined period of time according to the information received by the master station from the one accessed slave station so as to enhance a characteristic of the system for suitably responding to the information from the one accessed slave station.

17 Claims, 6 Drawing Sheets

FIG. 4(A)

| T0 | T1 | T2 | T3 | T4 | T5 | T6 | T7 | T8 | T9 | T10 | T11 | T12 | T13 | T14 | T15 | T16 |
|----|----|----|----|----|----|----|----|----|----|-----|-----|-----|-----|-----|-----|-----|
| 100 | 200 | 300 | 400 | 500 | 550 | 600 | 700 | 800 | 900 | 100 | 200 | 300 | 400 | 500 | 550 | 600 |

| 100 | 200 | 300 | 500 | 400 | 550 | 100 | 600 | 300 | 700 | 400 | 800 | 100 | 900 | 300 | 200 | 400 |

| | T0 | T1 | T2 | T3 | T4 | T5 | T6 | T7 | T8 | T9 | T10 | T11 | T12 | T13 | T14 |
|---|---|---|---|---|---|---|---|---|---|---|---|---|---|---|---|
| FIG.5(A) | 100 | 200 | 300 | 400 | 500 | 550 | 600 | 700 | 800 | 900 | 100 | 200 | 300 | 400 | 500 |
| FIG.5(B) | 100 | 300 | 400 | 800 | 900 | 200 | 500 | 550 | 600 | 700 | 100 | 300 | 400 | 800 | 900 |
| FIG.5(C) | 100 | 300 | 400 | 800 | 900 | 200 | 600 | 500 | 550 | 700 | 100 | 300 | 400 | 800 | 900 |

SYSTEM AND METHOD APPLICABLE TO AUTOMOTIVE VEHICLES UTILIZING TIME DIVISION MULTIPLEX MODE FOR COMMUNICATING DATA BETWEEN MASTER AND SLAVE STATIONS

BACKGROUND OF THE INVENTION (1) Field of the Invention

The present invention relates generally to a system and method for communicating data between terminals applicable to automotive vehicles.

(2) Background art

Various kinds of systems and methods for communicating data between terminals applicable to automotive vehicles have been proposed in which the information related to operations of a multiple number of operation portions is transmitted in a multiplex transmission mode via a fewer number of connection lines.

Such types of data communication systems are exemplified by U.S. Pat. Nos. 4,809,266 issued on Feb. 28, 1989, 4,926,417 issued on May 15, 1990, and 4,821,262 issued on Apr. 11, 1989.

Another previously proposed multiplex communication system will be explained below.

A vehicle is constituted, for example, by an engine compartment portion, dash board portion, instrument panel portion, and trunk portion. A first multiplex transmission module is installed on the engine compartment portion. A second multiplex transmission module is installed on the dash board portion. A third multiplex transmission module is installed on the instrument panel portion. A fourth multiplex transmission module is installed on the trunk portion.

The first multiplex transmission module is connected to a multiplex transmission line and switch load supply line. The second multiplex transmission module controls a vehicle lamp group in accordance with control data and is also connected to the multiplex transmission line. The first multiplex transmission module controls a front vehicle lamp group. Signal groups are transmitted from front vehicle lamps as well as an AT (automatic transmission) position switch group and an AT shift sensor group, the signals from these groups being superposed on the multiplex transmission line.

In the same way, the second multiplex transmission module controls the vehicle lamp group from control data derived from a plurality of switches and dash board peripheral switch groups installed on peripherals of the dash board portion.

The third multiplex transmission module installed on the instrument panel portion controls the instrument lamp group constituted by a plurality of lamps.

The fourth multiplex transmission module installed on the trunk portion controls rear vehicle lamp group.

In the previously proposed multiplex transmission system, a single multiplex transmission module installed on, e.g., the engine compartment portion, controls the lamp group at both sides of the vehicle, i.e., right front lamp group and left front lamp group. Therefore, if trouble occurs in the multiplex transmission module, both right and left front lamps cannot operate.

If separate multiple transmission modules to control the right and left front lamp groups are installed so that each front lamp groups can independently be controlled, the above drawback can be overcome.

In another previously proposed system, separate multiple transmission modules are installed for groups of terminals present at the left side and the right side of the vehicle. Further, these multiple transmission modules are located in a common housing with their respective terminals. Therefore, a number of connection lines between the terminals and operation portions, i.e., the number of (connector) harnesses, can be reduced.

Even if trouble occurs in one of the multiple transmission modules present at the left side of the vehicle in a pair of multiple transmission modules corresponding to terminals present at the left side and at the right side of the vehicle as described above, operation of the other multiple transmission module can be maintained.

However, in such a previously proposed multiplex communication system as described above, the number of multiplex transmission modules (which are configured as slave stations linked to a master station) are increased and sequential polling is carried out for the slave stations according to a calling order previously set so that communication between the master station and a selected slave station is carried out according to the calling order. Hence, a predetermined time is required for the master station to poll all of the slave stations, the polling cycle terminating with the last station according to the calling order. Therefore, a time delay often occurs between a time when an operator operates a particular operation portion until the time when the corresponding terminal is activated.

For example, assuming there are ten slave stations to be called in a given calling cycle. Referring to FIG. 4(a) a slave station 100 is associated with a headlamp switch, a slave station 200 being associated with a left headlamp and a slave station 600 associated with a right headlamp. When the head lamp switch associated with the first slave station 100, (called at a time $T_0$), is operated at a time $T_1$ after the first slave station has been called, the information from the head lamp switch will not be recognized until the station is called again in the subsequent calling cycle. That is to say, at a time $T_{10}$ (the beginning of the next calling cycle), the information that the light switch 100 has been operated will be present in the system. After the information is received by the terminal the head lamp arranged on a front left side of the vehicle will be operated, becoming ON when the slave station 200 is called at the time $T_{11}$. The right headlamp will not be operated until the slave station 600 for the front right headlamp is called at a time $T_{16}$. Hence, at a time $T_{17}$ when the callings to all appropriate slave stations is ended, the illumination of the pair of left and right headlamps is completed. Hence, in a case where a data time $T_f$ of the system data format is set at, e.g., 3.5 milliseconds, a response delay time of 3.5 ms occurs between each slave station from the time $T_1$ to $T_{17}$ (refer to FIG. 4) causing considerable delay to occur between the operation of the left headlamp and that of the right headlamp.

In addition, e.g., in a case where a hazard switch is operated to indicate an emergency condition, or to caution other drivers that the vehicle is stopped, it is necessary to simultaneously operate signal lamps arranged on the front right and front left sides of the vehicle so as to blink at a regular frequency. In such a case, if a delay occurs between a time when the multiplex transmission module which governs the terminal group arranged on the front left side of the vehicle is called and a time when the multiplex transmission module which governs the terminal group arranged on the front right side of the vehicle is called, the signal lamps arranged on each side of the vehicle cannot blink simultaneously. Therefore, further improvement is required.

SUMMARY OF THE INVENTION

It is a main object of the present invention to provide an improved multiplex communication system and method applicable to an automotive vehicle.

The above-described object can be achieved by providing A time division multiplex communication system, comprising: a) a master station for sequentially accessing a plurality of slave stations according to a predetermined calling order within a predetermined period of time and for transmitting a required information to any of the slave stations on the basis of information received from one accessed slave station; b) a transmission line connected between the master station and the plurality of slave stations for transmitting the information between the master station and slave stations; and c) means, responsive to the information received from the one particular accessed slave station, for changing the predetermined calling order according to the information received by the master station from the one accessed slave station so as to enhance a characteristic of the system for responding to the information from the one accessed slave station.

The above-described object can also be achieved by providing a time division multiplex communication system, comprising: a) first means, having a master station, a plurality of slave stations, and a transmission line connected between the master station and each slave station, for sequentially accessing a plurality of slave stations within a predetermined period of time and for transmitting a required information to at least one assigned slave station on the basis of information received by the master station from an accessed slave station; and b) second means, responsive to the information received from the accessed slave station, for setting a calling order for accessing each slave station within the predetermined period of time according to the information received from the one accessed slave station.

The above-described object can also be achieved by providing a method for communicating information with a master station and a plurality of slave stations in a time division multiplex mode, comprising the steps of: a) sequentially accessing the plurality of slave stations according to a predetermined calling order within a predetermined period of time and transmitting a required information to any of the slave stations on the basis of information received from one accessed slave station, b) transmitting the information between the master station and slave stations; and c) changing the predetermined calling order according to the information received by the master station from the one accessed slave station so as to enhance a characteristic of the system for responding to the information from the one accessed slave station.

BRIEF DESCRIPTION OF THE DRAWINGS

FIG. 4 (A) is an explanatory view explaining a calling order when all slave stations are called according to a previously proposed data communicating system as described in the BACKGROUND OF THE INVENTION.

FIG. 4 (B) is an explanatory view explaining a calling order of slave stations in the data communicating system of the first preferred embodiment according to the present invention.

FIGS. 5 (A) through 5 (C) are explanatory views explaining the calling order executed in a second preferred embodiment of the invention.

DETAILED DESCRIPTION OF THE PREFERRED EMBODIMENTS

Reference will hereinafter be made to the drawings in order to facilitate a better understanding of the present invention.

Figure 1:
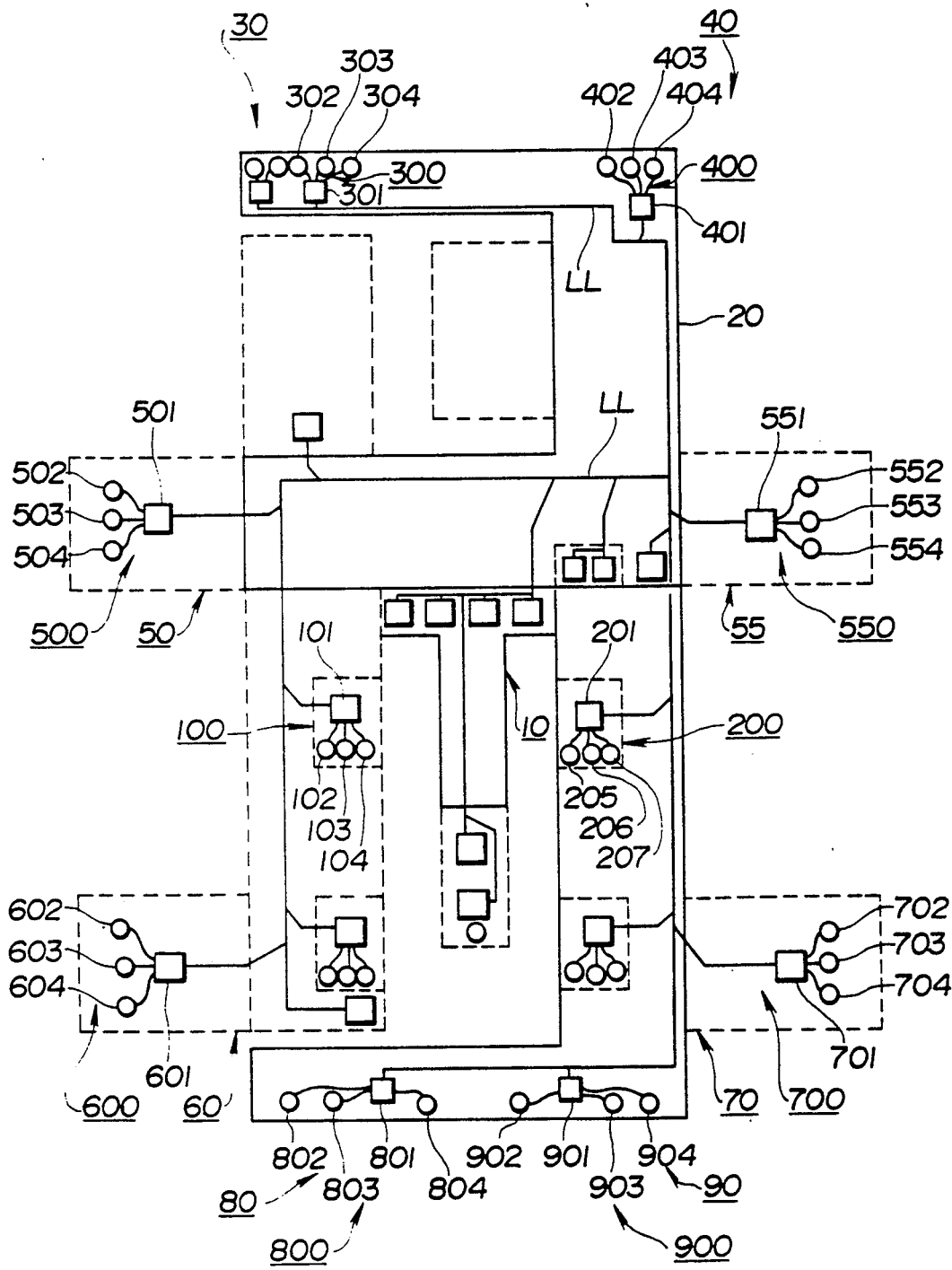
FIG. 1 is an explanatory view of an arrangement of a system for communicating data between data stations in a first preferred embodiment, as applicable to an automotive vehicle according to the present invention.

Referring to FIG. 1, a master station 10, arranged, for example, in the vicinity of the driver's seat of a vehicle 20 is connected to a plurality of slave stations 100, 200, 300, 400, 500, 550, 600, - - -, 900 via a multiplex transmission line LL.

The master station 10 includes a communication portion 11 (see FIG. 2) which executes polling of the plurality of slave stations to communicate with each slave station and a logic portion 12 which executes control of the corresponding terminals on the basis of information on the state of the operation portions collected via the multiplex transmission line LL.

The communication portion 11 is provided with calling means for sequentially calling all slave stations, a calling frequency for each slave station being carried out at high speed to provide a high degree of responsiveness.

The first slave station 100 is constituted by a communication portion 101 to carry out a communication with the master station 10 and a plurality of operation portions. Specifically, the plurality of operation portions are constituted by an instrument lamp switch 102 which turns on or off lamps for illuminating display portions of instruments, a head lamp switch 103 to turn the head lamps on or off, a turn signal switch 104 to indicate that the vehicle 20 is to be turned right or left, a hazard switch 105 to indicate that the vehicle 20 is being parked or is in an emergency state, and a horn switch 106. These switches are connected to the communication portion 101.

A second slave station 200 is arranged in the vicinity of the driver's seat. The slave station 200 is constituted by a communication portion 201 to communicate with the master station 10 and a plurality of operation portions. Specifically, the operation portions include a switch 205 for driving a left front power window, a switch 206 for driving a right front power window, a switch 207 for driving a left rear power window and a switch 208 for driving a right rear power window. These switches are connected to the communication portion 201.

A third slave station 300 is installed in a housing 30 arranged on a front left side of the vehicle 20. The third slave station 300 is constituted by communication portion 301 and a plurality of terminals constituted by a parking lamp 302 installed on a front left side of the vehicle, a head lamp 303, a turn signal lamp 304, and horn 305. These terminals are connected to the communication portion 301.

A fourth slave station 400 is installed in a housing 40 arranged on a front right side of the vehicle 20 and is constituted by a communication portion 401 to communicate with the master station 10 and a plurality of terminals constituted by a parking lamp 402, head lamp 403, turn signal lamp 404, and a door lock switch 405. These terminals are connected to the communication portion 401, respectively.

A fifth slave station 500 is arranged on a door 50 installed on the front passenger side of the vehicle 20. The fifth slave station 500 is constituted by a communication portion 501 to communicate with the master station 10 and a plurality of terminals installed on the door 50 with corresponding operation portions. The plurality of terminals are constituted by a power window motor 502 and a motor 503 for locking the door and a switch 504 which is an operation portion to drive the power window motor 502. These terminals are connected to the communication portion 501.

A sixth slave station 550 is arranged on a door 55 placed on the driver's side of the vehicle 20. The sixth slave station 550 is constituted by a communication portion 551 to communicate with the master station 10, a plurality of terminals is installed on the door 55 at the driver's seat side, with corresponding operation portions. The plurality of terminals are constituted by a power window motor 552 and motor 553 for locking the door and a switch 554, which is an operation portion for driving the power window motor 552. These terminals are connected to the communication portion 551.

A seventh slave station 600 is arranged on a door 60 installed on a left rear side of the vehicle 20. The seventh slave station 600 is constituted by a communication portion 601 to communicate with the master station 10, and a plurality of terminals and corresponding operation portions. The terminals are constituted by a power window motor 602 and a motor 603 for locking the door, in addition a switch 604 is provided as an operation portion for driving the power window motor 602. These terminals are connected to the communication portion 601.

An eighth slave station 700 is arranged on a door 70 installed on a right rear side of the vehicle 20. The eighth slave station 700 is constituted by a communication portion 701 to communicate with the master station 10, and a plurality of terminals installed on the door 70, with corresponding operation portions. The terminals are constituted by a power window motor 702 and a motor 703 for locking the corresponding door and a switch 704, which is an operation portion for driving the power window motor 702. These terminals are connected to the communication portion 701.

A ninth slave station 800 is arranged in a housing 800 installed on a rear left side of the vehicle 20. The ninth slave station 800 is constituted by a communication portion 801 to communicate with the master station 10 and a plurality of terminals constituted by a tail lamp 802, a turn signal lamp 803, and a license plate lamp 804. These terminals are connected to the communication portion 801.

A tenth slave station 900 installed on a rear right side of the vehicle 20. The slave station 900 is constituted by a communication portion 901 to communicate with the master station 10 and a plurality of terminals constituted by a tail lamp 902, a turn signal lamp 903, an an trunk compartment interior lamp 904. These terminals are connected to the communication portion 901.

Figure 3:
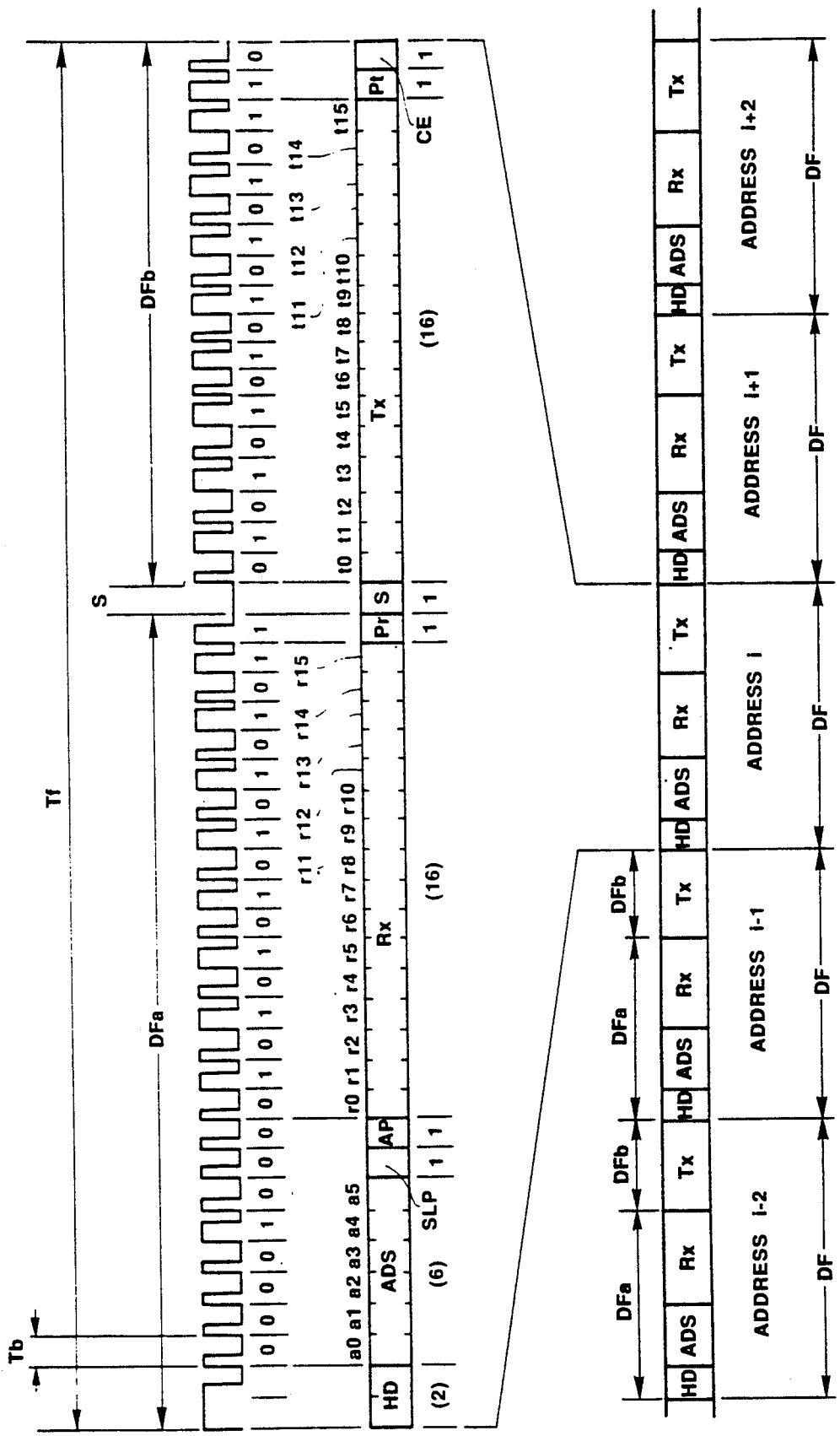
FIG. 3 is an explanatory view of a data format set when a master station executes polling of a slave station.

FIG. 3 shows a data format used for a basic operation of the data communication system.

An address is allocated to each of the plurality of slave stations 100, 200, 300, 400, 500, 550, 600, - - -, 900. When this address is specified, the corresponding slave station is called. Each slave station monitors address information transmitted from the master station 10. When an address is specified, calling the corresponding slave station, the called slave station returns an information signal DFb, which will be described later, to the master station 10. Then, communication is established between the master station 10 and the called slave station.

As shown in the lower portion of FIG. 3, a data format DF for the slave stations having the addresses $i-2$, $i-1$, $i+1$, $i+2$, respectively, is set. These data formats DF are formed with an information DFa to be transmitted from the master station 10 to the corresponding slave station and an information DFb to be transmitted from the slave station to the master station 10.

As shown in the upper portion of FIG. 3, the data format DF is constituted by two bits of header signal HD indicating the start of data, an address information ADS constituted by six bits of data a 0, a 1, a 2, - - -, a 5, one sleep bit SLP used for halting the slave station, one parity bit AP, and drive information Rx constituted by 16 bits r 0, r 1, r 2, - - -, r 15, and one parity bit P r. In addition, the information DFb is constituted by operation information Tx comprising 16-bit data t 0, t 1, t 2, - - -, t 15, one parity bit P t, and one error bit CE. A switching time S is set to perform switching of the communication circuit between the information DFa and information DFb. During the switching time S, no communication is carried out.

A unit bit forming various types of information is generated by a pulse width modulation method (PWM) as shown in FIG. 3. A bit time Tb of the unit bit is set at, e.g., 70 microseconds. The data time Tf of the data formats DF is set, e.g., at 3.5 milliseconds.

Next, an operation will be described, e.g., when a headlamp switch 103 of the slave station 100 is operated to turn on.

The master station 10 transmits the information DFa constituted by a header signal HD, an address information ADS of the slave station 100, the sleep bit SLP, the parity bit AP, drive information Rx, and the parity bit Pr to the first slave station 100. At this time, the data bits r0, r1, r2, - - -, 15 forming the drive information Rx are set at a logic value [0] and the parity bit Pr is set at a logic value [1].

Next, the slave station 100 transmits the operative information Tx and the information DFb constituted by the parity bit Pt and the error bit CE to the master station 10. At this time, when the information related to the operation of the headlamp switch 103 corresponds to the data bit t 0. In this case, the data bit t 0 is set to the logic value [0] and the other data bits t1, t2, t3, - - -, t15 are set at the logic value [1]. In addition, the parity bit Pt and error bit CE are respectively set to the logic value of [0].

Next, if the master station 10 receives the information DFb from the slave station 100, the master station 10 interprets the operation information Tx and determines that the headlamp switch 103 has been operated since the data bit t 0 is at the logic value of [0]. Thus, the master station 10 activates the corresponding terminals, i.e., a headlamp 303 and parking lamp 302 of the slave station 300, a headlamp 403 and parking lamp 402 of the slave station 400, tail lamp 802 and licence lamp 804 of the slave station 800, tail lamp 902 of the slave station 900, to be illuminated, respectively.

The master station 10 transmits the information DFa including the drive information Rx that the headlamp 303 and parking lamp 302 are to be illuminated to the slave station 300. At this time, in a case where, a data bit r 0 is allocated corresponding to the parking lamp 302, the data bit r 0 is set to the logic value [0] and the other data bits r1, r2, - - -, r15 are set to the logic value of [1].

When the information DFa from the master station is received by the slave station 300, the slave station interprets the drive information Rx. When the slave station detects that the data bits r 0 and r 1, for example are at the logic value of [0], the slave station determines that it is a turn on command for the headlamp 303 and parking lamp 302, thus, the slave station 300 turns on these lamps. When a switching time S is passed after the receipt of the information DFa from the master station 10, the slave station 300 transmits the information DFb to the master station 10. At this time, since the slave station 300 is not provided with the operation portion, the data bits t0, t1, t2, t3, - - -, t15 are set to the logic value of [1].

In the same way, when the master station 10 transmits the information DFa that the headlamp 403 and parking lamp 402 are to be turned on to the slave station 400, these lamps are illuminated.

The master station 10 transmits the information DFa to the slave station 800 that the tail lamp 802 and licence lamp 804 are to be turned on and transmits the information DFa to the slave station 900 that the tail lamp 902 is to be turned on. Thus, the tail lamp 802, licence lamp 804 and the tail lamp 902, are respectively turned on.

Next, an operation in a case where a switch 207 is operated in order to open the left rear power window.

First, the master station 10 transmits the information DFa to the slave station 200, the information DFa including the drive information Rx constituted by the logic value [0] of all data bits r0, r1, r2, - - -, r15 in order to collect the information related to the operation.

The slave station 200 transmits the information DFb including the operation information Tx that the switch 207 has been operated upon lapse of the switching time S after the information DFa has been received. At this time, if the information related to the operation on the switch 207 is allocated so as to correspond to the data bit t 7, only the data bit t 7 is set to the logic value [0] and the other data bits are set to the logic values of [1].

When the master station 10 receives the information DFb from the slave station 200, the operation information Tx is interpreted. When the master station 10 detects that the data bit t 7 is at the logic value of [0], the master station 10 determines that the switch 207 has been operated. Thus, the master station 10 transmits the information DFa including the drive information Rx that the left door power window is to be opened. At this time, in a case where the drive information to open the left rear power window is allocated so as to correspond to the data bit r 1, the data bit R 1 is set to the logic value [0] and the other bits are set to the logic values of [1].

When the slave station 600 receives the information DFa from the master station 10, the drive information is interpreted. When the slave station 600 detects that the data bit r 1 is at the logic value of [0], the power window motor 602 is driven so that the window glass placed at the left rear seat is lowered. Then, the switching time S is passed after the slave station 600 receives the information DFa from the master station 10. Thereafter, the slave station 600 transmits the information DFb to the master station 10, the information DFb including the operation information Tx constituted by the logic values of [1] of all bits.

As described above, the master station 10 sequentially executes the polling for the respective slave stations according to the calling orders previously set so that the information is collected from each slave station. In a case where the terminals are driven according to the information thus collected, the drive information is transmitted to the slave station when the master station 10 sequentially carries out the polling for the slave stations according to the calling order and calls the slave station having the corresponding terminal.

Next, the calling order for sequentially calling the plurality of the slave stations will be described.

The communication system in the first preferred embodiment according to the present invention sets higher calling frequencies for the first slave station 100 having the head lamp switch 103 as shown in FIG. 4(B), the third slave station 300 having the head lamp 303 arranged on the front left side of the vehicle 20, and the slave station 400 having the head lamp 403 arranged on the front right side of the vehicle 20.

Specifically, during the interval of time during which all slave stations 100, 200, 300, 400, 500, 550, 600, - - -, 900 are called, i.e., the interval of time from a time T0 to time T 16, as shown in FIG. 4(B), the slave stations denoted by 100, 300, and 400 are twice called but the other slave stations are once called.

The operation in a case where the head lamp switch 103 arranged in the slave station 100 is operated at a time T1 shown in FIG. 4(B) will be explained below.

In a case where the head lamp switch 103 is operated at the time T1, the calling to the slave station 100 has already been terminated. Therefore, the information related to the operation of the head lamp switch 103 cannot be collected. When the slave station 100 is again called, the information that the head lamp switch 103 is collected at the time T7, according to the high calling frequency shown in FIG. 4(B).

The master station 10 detects that the head lamp switch 103 has been operated. Then, the master station determines that the corresponding terminal, i.e., the head lamp 303 arranged on the slave station 300 and the head lamp 403 arranged on the slave station 400 are to be turned on.

When, at a time T 8, the slave station 300 is called, the information DFa is transmitted to the slave station 300 from the master station, the information including the drive information Rx that the head lamp 303 is to be turned on. The slave station 300, upon receipt of the information DFa from the master station, interprets the drive information Rx and determines that a turn on command to the head lamp is received. Thus, the slave station 300 turns on the head lamp 303.

When, at a time T10, the slave station 400 is called, the master station 10 transmits the information DFa including the drive information Rx that the head lamp 403 is to be turned on to the slave station 400.

When the slave station 400 receives the information DFa from the master station 10, the slave station 400 determines that a turn on command to the head lamp is received. Thus, the slave station 400 turns on the head lamp 403.

As described above, when the activation of the head lamp 303 arranged on the front left side of the vehicle is completed at a time T9 at which the calling for the slave station 300 is completed and the turning on of the head lamp 403 arranged on the front right side of the vehicle is completed at the time T11 at which, the calling to the slave station 400 is completed, even if the headlamp switch 103 is operated at a time T1 at which the calling to the slave station 100 is completed, the turning on the pair of head lamps 303 and 403 can be completed after lapse of 35 milliseconds. Hence, as compared with the previously proposed system shown in FIG. 4(A), the maximum response delay time can be reduced by about 23%. The response from a time at which the head lamp switch is operated to a time at which the head lamps are turned on can be remarkably reduced.

A second preferred embodiment of the data communication system will be described below.

Figure 2:
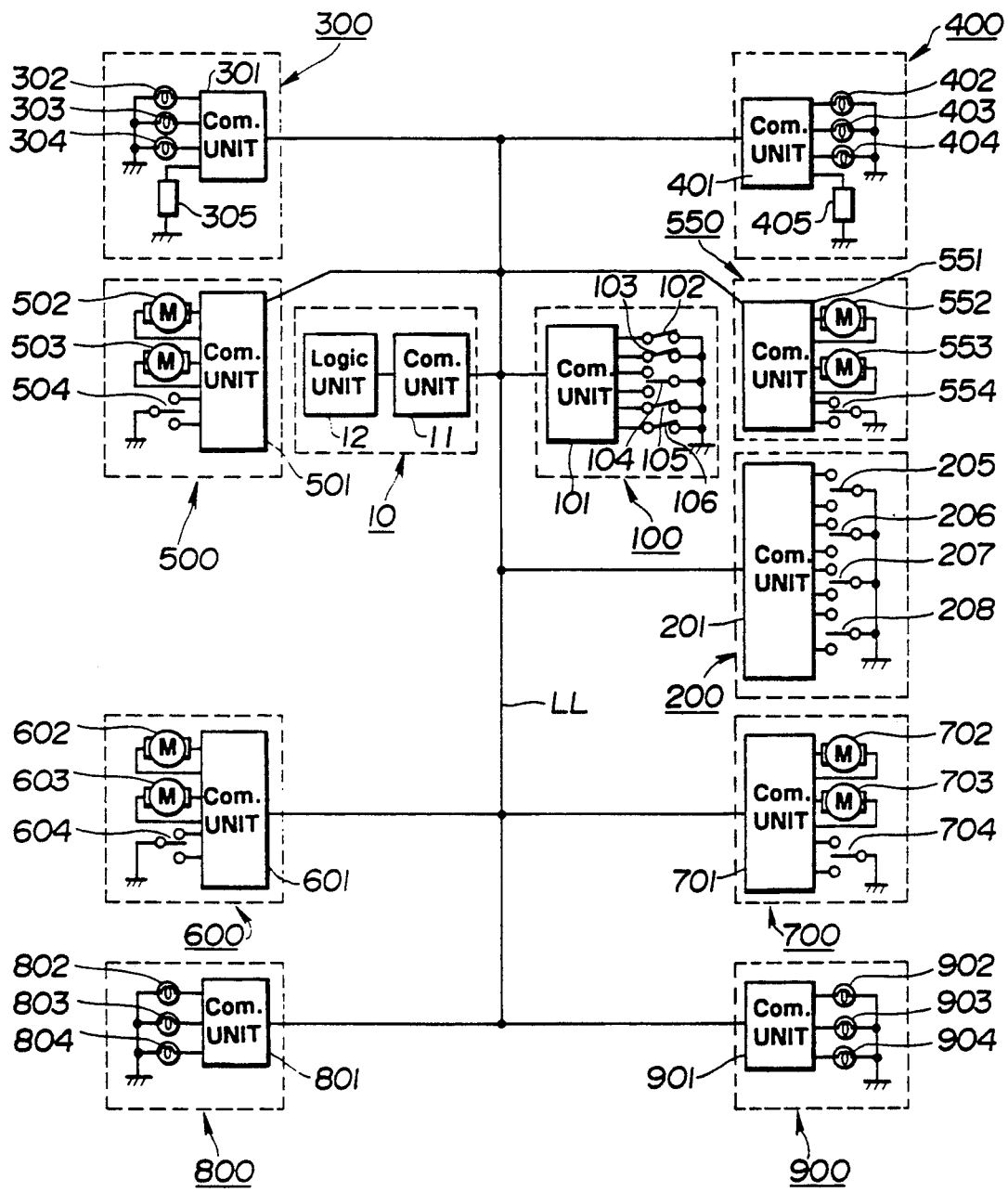
FIG. 2 is a circuit block diagram of the system for communicating data between the data stations for the first preferred embodiment shown in FIG. 1.

It is noted that the structure of the second preferred embodiment is the same as shown in FIGS. 1 through 3.

The calling order in the second preferred embodiment in which the communication portion 11 calls for each slave station is set as shown in FIG. 5(B).

In the second preferred embodiment slave stations containing operation portions are polled, immediately followed by polling of the slave stations for which the first polled operation portions are applicable.

That is to say, immediately after the slave station 100 has been called, the other slave, stations 300, 400, 800, and 900 are sequentially called, which are the slave stations having terminals corresponding to the instrument lamp switch 102, head lamp switch 103, turn signal switch 104, hazard switch 105, and horn switch 106 for which the slave station 100 contains operation portions. In the same way, immediately after the slave station 200 is called, the slave stations 500, 550, 600, and 700 are sequentially called as they have terminals corresponding to the operation portions 205, 206, 207, and 208 of the slave station 200.

An operation in which the switch 207 is operated in order to open the left rear power window will be described below at a time T5 shown in FIG. 5(B).

The master station 10 transmits the information DFa including the drive information Rx which is constituted by the logic values of [0] of the data bits r0, r1, r2, - - - r15 in order to collect the information related to the operation for the slave station 200.

The slave station 200, upon passage of the switching time S after the receipt of the information DFa, transmits the information DFb to the master station 10 including the drive information that the switch 207 has been operated. At this time, in a case where the information related to the operation of the switch 207 is allocated so as to correspond to the data bit t7, only the data bit t7 is set to the logic value of [0] and the other data bits are set to the logic value of [1].

When the information DFb from the slave station 200 is received by the master station 10, the operation information Tx is interpreted. When the master station 10 detects that the data bit t7 is at the logic value of [0], the master station 10 determines that the switch 207 has been operated.

The slave station 600 is called at a time T8 at which the communications to the slave stations 500 and 550 have been completed, and the master station 10 transmits the information DFa to the slave station 600, including the drive information Rx that the left rear power window is to be lowered. At this time, in a case where the drive information for lowering the left rear power window is allocated so as to correspond to the data bit r1, the data bit r1 is set to the logic value [0] and the other data bits are set to the logic value of [1].

The slave station 600, when receiving the information DFa from the master station 10, interprets the drive information Rx and detects that the data bit t1 is at the logic value of [0]. At this time, the power motor window 602 is driven to lower the left rear power window. When the switching time S is passed after receipt of the information DFa from the master station 10, the information DFb including the operation information TRx constituted by the logic values of [1] of all data bits is transmitted to the master station 10.

In this way, when information related to operation of the operation portions is collected, the slave station(s) having terminals related to the operated operation portion is/are called to drive the corresponding terminal.

Next, a third preferred embodiment will be explained with reference to FIG. 5(C).

It is noted that the structure of the third preferred embodiment is the same as those shown in FIGS. 1 through 3.

A feature of the third preferred embodiment is that the corresponding terminal is quickly driven by calling the slave station having the terminal corresponding to the operation portion immediately when the information related to the operation of operation portion is collected.

Specifically, when the information related to the operation of operation portion is collected by the master station 10, the master station 10 calls the slave station having the terminal corresponding to the operation portion as the next station in the calling order and immediately calls the related slave station.

For example, when the master station 10 determines that the switch 207 has been operated, communicating with the slave station 200 at a time T5 as shown in FIG. 5(C), the master station 10 immediately calls the slave station 600 having the power window motor 602 corresponding to the switch 207 at a time T6. Thus, the power window motor 602 is immediately driven so that the window glass arranged on the rear left side of the vehicle can be lowered. Hence, an operation time delay of the terminal corresponding to the operated operation portion can be further reduced.

A fourth preferred embodiment of the data communication system will be described below.

It is noted that the structure of the fourth preferred embodiment is the same as those shown in FIGS. 1 through 3.

In the fourth preferred embodiment, the logic portion 12 is provided with setting means for setting the calling order for each slave station according to the information related to the operation of operation portions as collected.

The operation of the fourth preferred embodiment when the hazard switch 105 is turned on will be described below.

Figure 6:
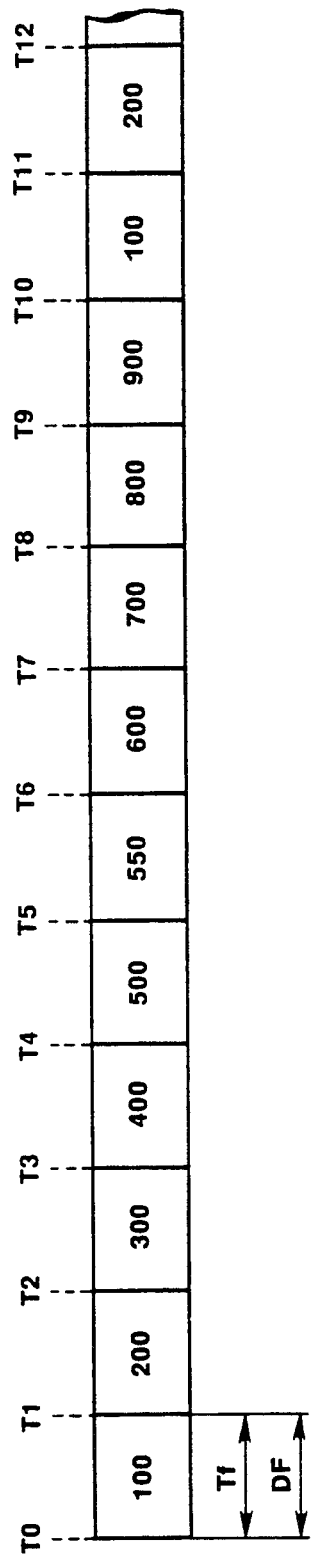
FIGS. 6 (A) and 6 (B) are explanatory views of calling orders executed to call respective slave stations in cases of steady state operation, such as when a hazard lamp or a turn signal switch is operated according to a third preferred embodiment of the invention.

The calling order for each slave station is set as shown in FIG. 6 (A) in a case where the hazard switch 105 is operated.

In a case where the hazard switch 105 is operated, the calling order for each slave station is set as shown in FIG. 6 (A).

For example, the hazard switch 105 installed in the slave station 100 at the time T0 shown in FIG. 6 (A) is operated, the master station 10 communicates with the slave station 100 at the time T0, so that the information DFb including the drive information Tx that the hazard switch 105 has been operated is collected.

The master station 10 interprets the operation information Tx and determines that the hazard switch 105 has been operated.

Next, after the master station 10 has ended the communication to the slave station 200, the master station 10 carries out the communication with the slave station 300 at the time of T2. At this time, the master station 10 transmits the information DFa including the drive information Rx that the turn signal lamp 304 is to be set to blink on and off. Thus, the slave station 300 activates the turn signal lamp 304 in such a manner. Thereafter, the master station 10 carries out the communication with the slave station 400 at the subsequent time T3 and transmits the information DFa to the slave station 400, including the drive information Rx that the turn signal lamp 404 is to be set to blink.

As described above, the calling orders for the slave stations 300 and 400 are provided adjacent to each other, so that a pair of turn signal lamps 304 and 404 can be turned on and off substantially at the same timing.

At the subsequent time, the master station 10 carries out the sequential polling for each slave station 500, 550, 600, 700 to communicate with each slave station. At the time T8, the master station 10 communicates with the slave station 800. At this time, the master station 10 transmits the information DFa including the information Rx that the rear turn signal lamp 803 is to be set to blink. Then, the master station 10 transmits that information DFa to the slave station 900.

As described above, since the calling orders for the slave stations 800 and 900 are set in proximity to each other, the pair of turn signal lamps 803 and 903 installed on the right and left sides of the vehicle can be turned on and off substantially at the same timing.

Next, an operation when the turn signal switch 104 has been operated will be described.

In a case where the turn signal switch 104 has been operated, the calling orders for respective slave stations are set as shown in FIG. 6 (B).

As shown in FIG. 6 (B), when the turn signal switch 104 has been operated to indicate that the vehicle is to turn left, e.g., at the time T0, the master station 10 collects the operation information that the turn signal switch 104 has been operated. Thus, the master station 10 has determined that the turn signal switch 104 has been operated.

At this time, the master station 10 sets the next station to be called as station 300 and, at a time T1, transmits the information DFa to the slave station 300 including the drive information Rx that the left front turn signal lamp 304 is to be turned on and off (blink).

Thus, the slave station 300 turns on and off the turn signal lamp 304. The master station 10 then carries out communication with the slave station 800 at the time T2. The master station 10 transmits the information DFa including the drive information Rx that the left rear turn signal lamp 803 is to be turned on and off. Thereby, The slave station 800 then turns on and off the turn signal lamp 803.

As described above, since the calling orders for the slave stations 300 and 800 are set in proximity to each other, the pair of the turn signal lamps 304 and 803 can be turned on and off substantially at the same timing.

It is noted for the above embodiment that, if a right turn is signaled by the turn signal switch 104 at the time T0, the master station would accordingly set the next stations to be addressed as 400 and 800 as these stations contain the terminals relating to activating the right turn signal.

As described hereinabove, in a time division multiplex communication system applicable to automotive vehicles, the calling order is changed according to the information of the particular accessed slave station so as to enhance a characteristic of the system for responding to the information from the one accessed slave station.

It will fully be appreciated by those skilled in the art that the foregoing description has been made in terms of the preferred embodiments and various changes and modifications may be made without departing from the scope of the present invention which is to be defined by the appended claims.

What is claimed is:

1. A time division multiplex communication system, comprising:
   a) a master station for sequentially accessing a plurality of slave stations according to a predetermined calling order within a predetermined period of time and for transmitting a required information to any of the slave stations on the basis of information received from one accessed slave station;
   b) a transmission line connected between the master station and the plurality of slave stations for transmitting the information between the master station and slave stations; and
   c) changing means, responsive to the information received from the one accessed slave station, for changing the predetermined calling order according to the information received by the master station from the one accessed slave station so as to enhance a characteristic of the system for responding to the information from the one accessed slave station,
   wherein the changing means comprises first means for increasing the access frequency of a particular slave station and at least one other corresponding slave station which carries out an operation in response to the information from the master station.

2. A time division multiplex communication system as set forth in claim 1, wherein the slave stations include a plurality of slave stations having one or more operation portions and a plurality of slave stations having terminals corresponding to said operation portions and wherein the first means includes:
   second means for setting the calling frequency of one particular slave station having one or more operation portions and of at least one slave station having at least one terminal which requires an enhanced responsive characteristic;
   third means for collecting the information related to an operation of a particular operation portion provided by the one particular slave station when the second means calls; and
   fourth means for driving the at least one terminal when the second means calls the at least one slave station containing said at least one terminal which corresponds to the particular operation portion transmitting the information related to the operation thereof.

3. A time division multiplex communication system as set forth in claim 2, wherein the system is installed in a vehicle and wherein the particular operation portion is constituted by an operation portion related to a head lamp switch and the particular terminal is constituted by a head lamp and wherein the second means sets the calling frequency for the slave station having the operation portion related to the head lamp switch and for that of the terminal related to the head lamp.

4. A time division multiplex communication system as set forth in claim 3, wherein a format of data transmitted between the master station and each slave station via the transmission line is constituted by an information (DFa) having a header bit (HD), an address information (ADS) allocated to each slave station, a sleep bit (SLP), a first parity bit (AP), drive information (Rx), and a second parity bit (Pr) and an information (DFb) having a switching time bit (S), an operation information (Tx), a third parity bit (Pt), and an error bit (CE).

5. A time division multiplex communication system, comprising:
 a) a master station for sequentially accessing a plurality of slave stations according to a predetermined calling order within a predetermined period of time and for transmitting a required information to any of the slave stations on the basis of information received from one accessed slave station;
 b) a transmission line connected between the master station and the plurality of slave stations for transmitting the information between the master station and slave stations; and
 c) changing means, responsive to the information received from the one accessed slave station, for changing the predetermined calling order according to the information received by the master station from the one accessed slave station so as to enhance a characteristic of the system for responding to the information from the one accessed slave station,
 wherein the changing means comprises first means for changing the calling order so as to continuously access the slave stations which require an intermittent operation in response to information from the master station.

6. A time division multiplex communication system as set forth in claim 5, wherein the first means comprises: second means for collecting the information related to an operation of each operation portion of the plurality of slave stations installed so as to correspond to at least a terminal of the plurality of slave stations; third means for calling one of the slave stations which relates to the operation of a particular operation portion at a first priority from among the slave stations when the information related to the operation of the operation portion is collected; and fourth means for driving the terminal corresponding to the operation portion operated by the third means.

7. A time division multiplex communication system as set forth in claim 6, wherein the third means immediately calls one of the slave stations which relates to the operation of the operation portion from among the slave stations when the information related to the operation of the operation portion is collected.

8. A time division communication system as set forth in claim 7, wherein the third means calls one of the slave stations which relates to the operation of the operation portion in priority from among the slave stations when the information related to the operation of the operation portion is collected.

9. A time division multiplex communication system as set forth in claim 7, wherein the system is applied to an automotive vehicle and wherein the operation portion includes a switch for opening a window and the related terminal includes a power window motor for opening the said window.

10. A time division multiplex communication system as set forth in claim 5, wherein the slave stations include a plurality of operation units having operation portions and a plurality of terminal units each having one or more terminals corresponding to respective operation units and wherein the first means includes:
 second means for collecting operation information related to operation of each operation unit with each operation unit being sequentially called;
 third means for changing the calling order to sequentially call terminal units according to the collected operation information; and
 fourth means for driving the terminals corresponding to the operation unit according to the collected information when each terminal unit is called according to the changed calling order.

11. A time division multiplex communication system as set forth in claim 10, wherein the plurality of operation units includes a first operation unit having an operation portion related to a hazard signal for an automotive vehicle and a second operation unit having an operation portion related to a direction indication, the plurality of terminal units includes a first terminal unit having a front left direction indication lamp, a second terminal unit having a front right direction indication lamp, a third terminal unit having a rear left direction indication lamp, and a fourth terminal unit having a rear right direction indication lamp and wherein the third means changes the calling order so as to access the first, second, third and fourth terminal units when the collected information is related to the operation of the operation unit related to the hazard signal and so as to access the first and third terminal units substantially immediately subsequent to each other or the second and fourth terminal units substantially immediately subsequent to each other when the collected information is related to the operation of the operation unit related to the direction indication, the third means accessing said first and third terminal units or the second and fourth terminal units depending on the direction of said directional indication.

12. A time division multiplex communication system as set forth in claim 5, wherein said first means comprises means for accessing said slave stations requiring an intermittent operation in a continuous sequence of immediately adjacent time periods of the calling order.

13. A time division multiplex communication system, comprising:
 a) a master station for sequentially accessing a plurality of slave stations according to a predetermined calling order within a predetermined period of time and for transmitting a required information to any of the slave stations on the basis of information received from one accessed slave station;
 b) a transmission line connected between the master station and the plurality of slave stations for transmitting the information between the master station and slave stations; and
 c) changing means, responsive to the information received from the one accessed slave station, for changing the predetermined calling order according to the information received by the master station from the one accessed slave station so as to enhance a characteristic of the system for responding to the information from the one accessed slave station, wherein:

the changing means comprises first means for changing the calling order so as to access, in sequential proximity to the one accessed slave station, a slave station which requires an operation in response to information received by the master station from the one accessed slave station; and the slave stations include a plurality of operation units having operations portions and a plurality of terminal units each having one or more terminals corresponding to respective operation units, and wherein the first means includes:

second means for collecting operation information related to operation of each operation unit with each operation unit being sequentially called;

third means for changing the calling order to sequentially call terminal unit according to the collected operation information; and fourth means for driving the terminals corresponding to the operation unit according to the collected information when each terminal unit is called according to the changed calling order.

14. A time division multiplex communication system, comprising:

a) a master station for sequentially accessing a plurality of slave stations according to a predetermined calling order within a predetermined period of time and for transmitting a required information to any of the slave stations on the basis of information received from one accessed slave station;

b) a transmission line connected between the master station and the plurality of slave stations for transmitting the information between the master station and slave stations; and c) first means for increasing an access frequency for a particular slave station which requires a fast responsive characteristic to a predetermined higher access frequency and, with the predetermined higher access frequency for the particular slave station set, for sequentially accessing all slave stations.

15. A time division multiplex communication system as set forth in claims 14, wherein the slave stations include a plurality of slave stations having one or more operation portions and a plurality of slave stations having terminals corresponding to said operation portions and wherein said first means includes:

second means for setting to the predetermined high frequency the accessing frequency for the particular slave station having one or more operation portions and for at least one slave station having at least one terminal which requires the fast responsive characteristics;

third means for collecting the information related to an operation of a particular operation portion provided by the one particular slave station when said second means calls; and fourth means for driving the at least one terminal when said second means calls the at least one slave station containing said at least one terminal which corresponds to the particular operation portions transmitting the information related to the operation thereof.

16. A time division multiplex communication system as set forth in claim 15, wherein the system is installed in a vehicle and wherein the particular operation portion is constituted by an operation portion related to a head lamp switch and the particular terminal is constituted by a head lamp, and wherein the second means sets the accessing frequency for the slave station having the operation portion related to the head lamp switch and for that of the terminal related to the head lamp.

17. A time division multiplex communication system as set forth in claim 16, wherein a format of data transmitted between the master station and each slave station via the transmission line is constituted by an information (DFa) having a header bit (HD), an address information (ADS) allocated to each slave station, a sleep bit (SLP), a first parity bit (AP), drive information (Rx), and a second parity bit (Pr) and an information (DFb) having a switching time bit (S), an operation information (Tx), a third parity bit (Pt), and an error bit (CE).

* * * * *